United States Patent
Weller et al.

[15] 3,662,152
[45] May 9, 1972

[54] THERMOMAGNETIC SOLDERING TIP ASSEMBLY AND METHOD

[72] Inventors: Carl E. Weller, Easton; Wilbur A. Solt, Northampton, both of Pa.

[73] Assignee: Cooper Industries, Inc.

[22] Filed: Mar. 5, 1971

[21] Appl. No.: 121,389

[52] U.S. Cl.....................219/241, 29/517, 219/238, 219/495, 228/54, 317/133, 335/208
[51] Int. Cl.........................................B23k 3/02, H05b 1/02
[58] Field of Search.....................219/227, 229, 236–241, 219/495; 317/133; 228/51–55; 29/510, 511; 335/208

[56] References Cited

UNITED STATES PATENTS

| | | | |
|---|---|---|---|
| 2,951,927 | 9/1960 | Weller | 219/241 |
| 3,188,448 | 6/1965 | Weller | 219/241 |
| 3,287,541 | 11/1966 | Weller et al. | 219/241 |
| 3,315,350 | 4/1967 | Kent | 228/54 X |

*Primary Examiner*—A. Bartis
*Attorney*—Mason, Fenwick & Lawrence

[57] ABSTRACT

A cup-shaped thermomagnetic temperature sensing element is secured to the soldering tip of a heat controlled electric soldering iron by electroplating the shank end of the tip which fits into the cup-shaped thermomagnetic element with a thin coat of iron. The electrodeposited iron coating produces an enlargement at the edges of the reduced diameter shank forming a tapering surface axially inwardly. The cup-shaped thermomagnetic element may then be positioned over the enlargement and mechanically deformed around said enlargement to securely hold the thermomagnetic element to the end of the soldering tip.

8 Claims, 7 Drawing Figures

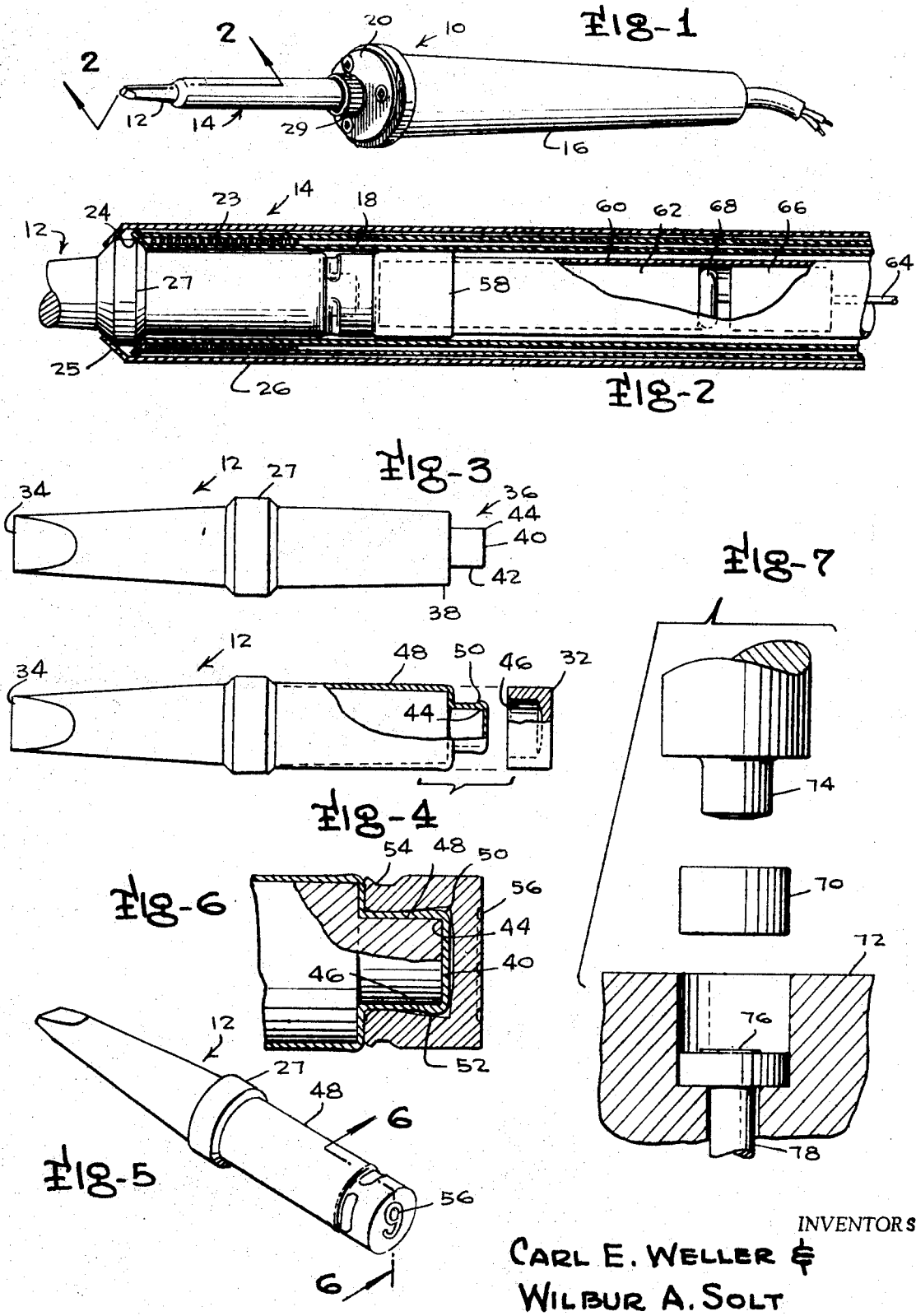

3,662,152

THERMOMAGNETIC SOLDERING TIP ASSEMBLY AND METHOD

BACKGROUND OF INVENTION

This invention relates in general to electrically heated soldering irons, and more particularly to electrically heated soldering irons having an automatic temperature regulating facility.

In the most common type of electrically heated soldering irons heretofore commercially produced, the tip temperature is determined by heat dissipation to the air by radiation, conduction and convection. This type of soldering iron is specifically designed so that the heat losses through radiation to ambient air are sufficient when the unloaded soldering tip reaches a desired idling temperature that they are equal to and therefore balance out any additional heat delivered to the soldering tip by the heating element establishing an equilibrium condition whereby no further increase in the temperature of the soldering tip occurs. Radiation losses are built into this type of soldering iron by providing a large mass and thus a large radiating area to produce the desired quantity of heat radiation for establishing the selected idling temperature. For example, conventional 55 watt soldering irons designed in this manner to have an idling temperature of about 650° F. would have a large shell surrounding the heating element and a large soldering tip to provide large radiating surfaces for dissipation of heat to the surrounding air. Such a tool will obviously have a high dissipation factor, meaning that the heating element is wasting a large portion of its heat, and of the input wattage, in heating the room and is producing little heat for the job of soldering. The heating element would, of course, remain seriously burdened by the necessity of supplying the heat for radiation losses when the soldering tip is quickly sapped of its heat by contact with the work and thus be unable to effectively keep the tip temperature up to the values necessary for good soldering.

A soldering iron designed to be more efficient in supply of heat energy to the soldering tip may have an idling temperature of about 1,000° F. and would have a reduced physical size and hence smaller radiation losses. Irons at these temperatures show quick and rapid deterioration of the soldering tip, requiring very frequent replacement. Additionally, such high-idling-temperature soldering irons would require highly skilled operators to avoid damage to components in the work area of the iron and to achieve a reliable solder joint, since the tip temperature is so high above solder melting temperature that great care must be exercised to avoid any movement of the parts to be bonded by the solder during the long cooling period down to solder freezing temperature.

Efforts have been made to automatically regulate the input power of soldering irons responsive to the tip temperature to provide low idling temperature with reduced radiation loss, by using thermostatic devices to limit the top temperature of the soldering iron, such as bimetals, linear expansion devices, air thermometers and thermocouples. These, however, have been characterized by problems of instability, short life, excessive cost, or failure to meet the basic requirement of controlling the temperature of the tip when used in the act of soldering.

U. S. Pat. No. 2,951,927, granted Sept. 6, 1960 to Carl E. Weller discloses a soldering iron having a control element of temperature-sensitive ferromagnetic material and a movable magnet and switch mechanism for regulating input power in selected relation to tip temperature which avoid the above-mentioned problems.

Temperature control for the tip of the tool is provided by an element made of temperature-sensitive ferromagnetic material having a Curie point in an appropriate temperature range, which hereinafter will be referred to as a "thermomagnetic material." The thermomagnetic material is disposed in intimate thermal contact with both the soldering tip and the temperature regulating means, which means are provided to utilize the characteristic of this thermomagnetic material to be ordinarily magnetic and to become substantially non-magnetic or of reduced magnetic strength when heated to a sufficiently high temperature by changes in temperature of the soldering tip to secure the desired control of the energizing circuit for the heating element and thereby establish an idling temperature, for example about 700° F., which may be well below the idling temperature which would result if dependent entirely upon the radiation losses designed into the tool. A specially designed control switch assembly responsive to the temperature-related magnetic properties of the thermomagnetic control element is provided in a special way to insure reliable regulation of temperature while providing long switch life.

Typical of the above construction is that disclosed in U. S. Pats. No. 3,188,048 issued June 8, 1965 to Carl E. Weller, and No. 3,287,541, issued Nov. 22, 1966 to Carl E. Weller, et al. These patents disclose a previous method and means for securing the thermomagnetic material to the soldering tip. Such a prior approach included forming the thermomagnetic control element with a large diameter head portion corresponding generally to the larger diameter of the end of the soldering tip remote from the working end or tip and a constricted shank portion which is adapted to fit into a complemental bore in the rear end of the body portion remote from the tip. The containment of the thermomagnetic material depended upon the existence of a tight or force fit between the constricted shank and the complemental bore of the thermomagnetic material.

This press fit assembly of the thermomagnetic material to the soldering tip would in time loosen because of the constant expansion and contraction inherent in the assembly due to the heating and cooling of the soldering tip. Also, moderate rough handling might loosen the intimacy of the contact between the thermomagnetic material and the soldering tip.

While such means of securing had been partially effective in the past, experience through a number of years of actual usage has demonstrated that a more effective means for securing the thermomagnetic material to the soldering tip must be developed in order to retain the intimate contact necessary between the thermomagnetic material and the tip to provide the proper thermal control which is a basic requirement for soldering irons of the type disclosed in the above patents.

OBJECTS OF THE INVENTION

It is a principal object of the present invention to provide a novel approach to providing the intimate contact between the thermomagnetic material and the soldering tip for use with an electrically heated soldering iron.

Another object of the present invention is the provision of an electrically heated soldering iron having a thermomagnetic element which is secured to the end of a soldering tip in a simple effective and economical manner.

A further object of the present invention is the provision of a novel electrically heated soldering iron in which the securing means between the thermomagnetic material and the end of the soldering tip is achieved in part through the provision of a reduced shank portion on the end of the soldering tip receiving the thermomagnetic material and electroplating the soldering tip prior to insertion of the shank into the thermomagnetic material.

A further, and more specific, object of the present invention is the provision of a novel electrically heated soldering iron incorporating a novel means of securing thermomagnetic material to the soldering tip by means of electroplating a reduced shank portion at the end of the soldering tip to provide a downward and inwardly tapered reduced shank portion enabling the thermomagnetic material to be secured thereon.

These and other objects of the present invention will become apparent from a study of the following details, specifications and claims when considered along with the accompanying drawings.

DESCRIPTION OF THE DRAWINGS

FIG. 1 is a perspective view of an electrically heated soldering iron embodying the present invention.

FIG. 2 is a fragmentary view partly in section of the soldering iron taken along lines 2—2 of FIG. 1.

FIG. 3 is a plan view of the soldering tip exhibiting the reduced diameter shank remote from the working end.

FIG. 4 is an exploded view partly in section illustrating the positioning of the thermomagnetic material upon the soldering tip and the change in dimensions of the soldering tip due to the electroplating.

FIG. 5 is a perspective view of the assembled soldering tip illustrating the crimping of the thermomagnetic material onto the reduced shank portion of the soldering tip.

FIG. 6 is a fragmentary view partially sectionalized and taken along lines 6—6 of FIG. 5 illustrating the completed assembly of the thermomagnetic material and the reduced shank portion of the soldering tip.

FIG. 7 is a fragmentary exploded view of the method of forming the cup-shaped thermomagnetic material from a pill.

DETAILED DESCRIPTION OF THE PREFERRED EMBODIMENT

Referring to the drawings wherein the same reference characters are applied to the same parts appearing in the various figures depicted, the soldering iron embodying the present invention is indicated generally by reference 10. The soldering iron includes soldering tip shown generally as 12 supported by an elongated barrel assembly 14 and a handle 16. The elongated barrel assembly 14 comprises an inner tubular member 18 which is frequently referred to as the "element spool" in surrounding relationship with the soldering tip. The bore of the element spool 18 receives the soldering tip 12 in a snug fitting relationship that provides good thermal communication between the element spool 20 and the soldering tip 12. As is best seen in FIG. 2, the element spool extends longitudinally rearwardly and terminates within the handle cover flange 20.

A second tubular member 22, which may be referred to as the "element cover tube," forms in conjunction with element spool 18 a concentric hollow annular space in which the heating element 23 and associated leads are placed. Element spool 18 and cover tube 22 each have forward ends that are flared outwardly and are joined at 24 to enclose the annular space there between. Cover tube 22 extends rearwardly and terminates in handle cover flange 20 that is preferably secured therein by a suitable adhesive such an an epoxy thereby forming a unitary tubular structure for accepting and positioning tip 12 within the inner bore of element spool 18 and providing good thermal relationship with the heating element 23. The element spool 18 and the element cover tube 22 are preferably formed of stainless steel to improve the increased life.

Soldering tip 12 is properly positioned within the inner bore of the element spool 18 by engagement of the inwardly extending tapered flange 25 of the draw tube 26 to contact the soldering tip. Again, as best shown in FIG. 2, the soldering tip is provided with raised peripheral ring 27 and a forward taper 28 on the peripheral ring which is designed to contact the tapered flange 25 of the draw tube 26. A freely rotatable threaded nut 29 secures the draw tube to the cover flange 20. This assembly is described and shown in greater detail in the previously mentioned U. S. Pat. No. 3,287,541.

The annular chamber formed between the concentric element spool 18 and the cover tube 22 is occupied by the heating element 23 of the soldering iron which may be formed in any manner, but is here illustrated as being wound in a single layer upon the element spool 20 as indicated by reference 30. These windings are wound from a continuous length of resistance wire in a bifilar manner so that the current flowing in adjacent wires is in opposite direction in order to produce cancellation of flux and form a non-inductive winding. Since the soldering iron of the present invention is to be used on low voltage, for example 24 volts, leakage currents and voltages at the tip are reduced and operator safety is improved. Due to the low voltage the heating element 23 need not be extensive in the number of turns nor in the depth of the winding in order to produce the desired high heating for transfer to the closely related soldering tip 12. The heating element extends into the handle and is connected to a switch assembly disclosed and illustrated in the previously mentioned U. S. patent.

The handle 16 preferably is formed from a molded plastic material having a unitary truncated cone shape open at opposite ends and having an open bore throughout its length. Forward end portion of the handle 16 is shaped to provide a cylindrical opening to receive the cover flange 20.

The foregoing description discloses in general the soldering iron and many of its basic elements but does not form the part of the present invention.

As best shown in FIGS. 3–5, the soldering tip assembly includes the thermomagnetic material in the form of a cup shape 32 that may be referred to as the "magnastat."

The soldering tip is preferably formed of machined copper which is then iron plated. The iron plating serves as a barrier against loss of copper from the soldering tip in the solution with molten solder during the use of the soldering iron and, as will be evident hereinafter, acts as a securing means for the magnastat.

The electroplating of the iron upon the soldering tip may be performed in any conventional manner to deposit anywhere from approximately 0.0007 to 0.02 inches of iron, depending upon the shape and style of the soldering tip. The thickness of the deposit is not critical to the present invention and may vary in accordance with the intended purpose. Preferably, the iron electroplated is such as to deposit a thickness from between 0.0055 to 0.010 inches of iron on the entire soldering tip as measured by the thickness in the solder wetted working area.

As was previously discussed, the prior art soldering tips were so constructed to be provided with a bore at the end of the tip remote from the working end 34 into which the thermomagnetic material would be force fit. It has been discovered that the iron electroplating can provide a securing means to hold the magnastat 32 onto the end of the soldering tip by providing a reduced shank end 36 cut away from and protruding end longitudinally and axially outwardly from the larger diameter end 38 of the shank forming the soldering tip. The terminal end surface 40 of the reduced shank is preferably planar while the sides of the shank portion 36 are cylindrical although it should be understood that no particular shape for the walls 42 is required. At the junction between the walls 42 and the end surface 40 a continuous edge 44 is provided.

The magnastat 32 in the form of a cup having an interior bore 46 is shaped to have the same interior bore configuration as the configuration of the walls 42 of the reduced shank 36.

To provide for securing the magnastat 32 to the reduced shank 36 it has been discovered that the electroplated deposit 48 which covers the entire soldering tip will accumulate in a thicker deposit or enlargement 50 along the edge 44 as shown in FIGS. 4 and 6. The increased buildup of the electroplated deposit of iron at 50 provides an inward tapering surface at 52 which will be gradual and directed towards the larger diameter end of 38 of the working tip.

The increased electrodeposited iron at 50 is due to the greater concentration of the current density along the edge 44 than along the side walls 42 or the terminal end surface 40 of the reduced shank 36. Gradually, as the deposit increases in distance away from the edge 44, the quantity of the deposit will decrease providing the tapered surface 52.

The magnastat 32 having the internal bore 46 shape to conform generally to the reduced shank 36 should have a diameter sufficiently large to closely fit past the enlargement or built-up thickness at 50. The enlargement forming the tapering surface 52 and particularly that closely adjacent the edge 44 will build up from about 5 to 200 per cent greater thickness than the thickness of the iron deposited along the smooth surfaces of the soldering tip. A taper such as would provide a diameter difference of about 0.0005 inches between the base of the reduced shank 36 adjacent the larger diameter end 38 compared to the electrodeposited thickness adjacent the edge 44 is all that is required. Preferably, a difference in diameter of 0.005 to 0.020 inches or broadly 0.001 to 0.020 inches would be adequate to meet the necessary requirements for a taper.

Once the taper has been formed and the magnastat 32 received over the electrodeposited iron coating 48, a crimping staking or squeezing step is performed upon the magnastat as shown at 54. This deformation is adjacent the mouth of the bore 46 of the magnastat 32 and will lock the magnastat onto the reduced shank 36 by the complementary surfaces formed by the deformed bore 46 of the magnastat and the tapering surface 52 of the electrodeposited iron coating.

The magnastat once crimped upon the end of the reduced shank 36 and locked into place by the electrodeposited coating will be permanently positioned and maintained and cannot be loosened by any rough handling or by the expansion and contraction inherent in the heating and cooling of the heating element and will provide the soldering tip with the same diameter at the end at which the magnastat is positioned.

The magnastat 32 is preferably provided with indicia 56 at the outward face as best shown in FIG. 5 which is adapted to be received in contact with the non-magnetic thermal bushing 8 forming the forward closure for the elongated stainless steel sleeve 60 which houses the cylindrical permanent magnet 62. This magnet is slidable, retained within the sleeve 60 and adapted to move slide rod 64 to the magnetic bushing 66 positioned within the sleeve 60 with the spacer 68 provided between the bushing 66 and the permanent magnet 62, all as described in the previously mentioned U. S. patents.

The indicia 56 embossed upon the end of the magnastat is produced in accordance with the apparatus as shown in FIG. 7 wherein a pill 70 composed of the thermomagnetic material is positioned within the female die 72. The pill may generally be of a diameter approximately 0.01 inches less than the diameter of the magnastat to be produced and is struck by the male die 74 powered by suitable conventional means (not shown) after the pill has been inserted into the female die 70. Indicia embossing means 76 is provided on the base of the ejection punch 78. Upon the downstroke of the male die 74, the pill 70 is formed into the magnastat having a shape as shown in FIG. 4.

What is claimed:

1. A soldering tip assembly for use in a thermomagnetic element, heat controlled electric soldering iron comprising: a soldering tip having both a working end and a shank end, and a thermomagnetic cup-shaped material positioned at the shank end, said shank end being provided with an edge remote from said working end and surrounding said shank end, an electrodeposited iron coating covering said soldering tip, said coating being of greater thickness in the area contiguous to said edge, said coating forming an enlargement at said edge, said thermomagnetic cup-shaped material having an internal bore receiving said shank end and said enlargement, said thermomagnetic cup-shaped material being deformed around said enlargement and fixedly secured to said shank whereby said thermomagnetic material is held firmly in place on the shank end of said soldering tip.

2. The soldering tip assembly of claim 1 wherein said coating forms a tapering surface along said shank end inwardly from said edge toward said working end.

3. The soldering tip assembly of claim 1 wherein said soldering tip is provided with a reduced diameter shank end protruding axially from a larger diameter shank portion of said soldering tip and wherein said reduced diameter shank end is provided with said enlargement.

4. The soldering tip assembly of claim 1 wherein said enlargement is between 5 and 200 per cent greater than the thickness of the coating along the smooth surface of the soldering tip.

5. The soldering tip assembly of claim 1 wherein the outside diameter of the soldering tip assembly is substantially the same across the thermomagnetic cup-shaped material and the soldering tip.

6. The method of securing a thermomagnetic cup-shaped material to the shank end of a soldering tip to form a soldering tip assembly for use in a thermomagnetic element heat controlled electric soldering iron comprising: forming a reduced diameter shank end at one end of the soldering tip remote from the working end, forming an edge substantially surrounding said shank end, electrodepositing a coating of iron on the soldering tip, forming an enlargement from said coating contiguous to said edge, inserting said cup-shaped thermomagnetic material onto said shank end and deforming said cup-shaped thermomagnetic material around said enlargement to fixedly secure said thermomagnetic material to said shank end.

7. The method of claim 6 wherein said electrodeposited iron forming the enlargement is of a thickness of 5 to 200 per cent greater than the coating deposited upon a smooth surface of said tip.

8. The method of claim 7 including forming said enlargement onto an inwardly tapering surface from said edge toward said working end.

* * * * *